July 16, 1940.   G. ULBRIGHT   2,208,349
DIRECTION FINDER
Filed Feb. 11, 1938
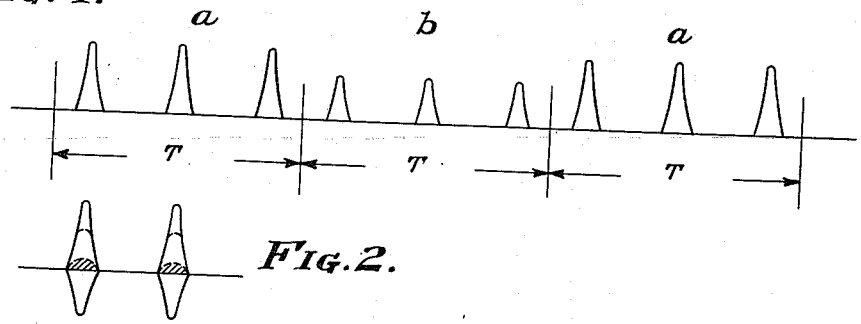
Fig. 1.
Fig. 2.
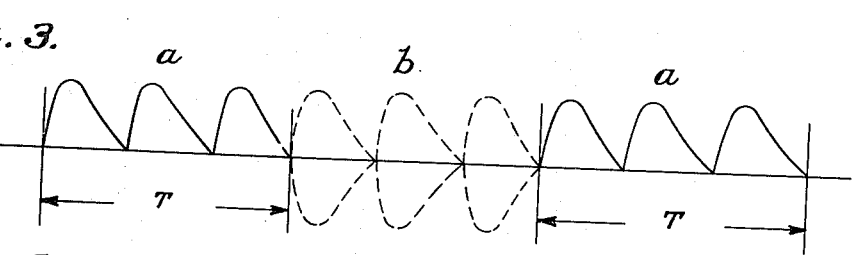
Fig. 3.
Fig. 4.
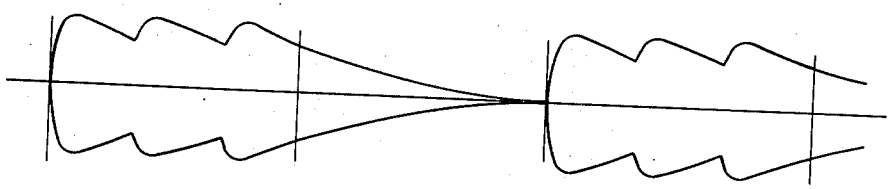
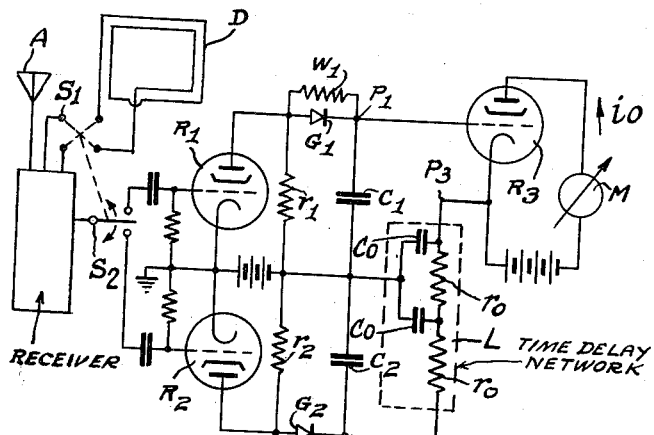
Fig. 5.
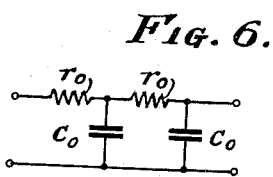
Fig. 6.
Inventor
Gunther Ulbricht
By
Attorney Patented July 16, 1940

2,208,349

UNITED STATES PATENT OFFICE 2,208,349

DIRECTION FINDER

Günther Ulbricht, Blankenfelde Mahlow, Germany, assignor to Telefunken Gesellschaft für Drahtlose Telegraphie m. b. H., Berlin, Germany, a corporation of Germany Application February 11, 1938, Serial No. 190,104
In Germany February 4, 1937

6 Claims. (Cl. 250—11)

This invention relates to impulse type direction finding systems, and particularly to a method of and means for providing a steady left-right indication of suitable sensitivity.

Direct reading left-right indicators which have been used in impulse direction finding systems of the prior art usually employ a center zero meter for the left-right indicator. One of the defects of such a system arises from the tendency of the meter to return to zero in the intervals between impulses, resulting in a pulsating or flickering indication which is difficult to observe. One reason for this tendency is that in order to obtain a left-right indication, the loop polarity and the combined impulse polarity are successively reversed so that impulses of successively opposite polarity are applied to the meter. Due to the inertia of the meter action, the needle cannot keep up with the rapid changes, but it tends to move in the direction of the impulse having the largest amplitude and vibrates or flickers about an average value.

In accordance with this invention, impulses are received successively, alternate impulses are inverted, delayed and applied to the meter not at successive moments but at the same time. The meter, therefore, responds to successive impulses which are effectively of the same polarity. The current of opposite polarity which tended to pull the pointer back and make it flicker has been removed. At the same time the meter sensitivity is effectively increased. It is also proposed to provide means for increasing the average value of the uni-potential impulses to further increase the steadiness and sensitivity of the indicator.

It is an object of this invention to provide a direction finding system of the impulse type which provides a steady left-right indication.

It is a further object of this invention to provide improved means for distinguishing between impulses of opposite polarity and of different amplitude.

It is a further object of this invention to provide a left-right indicator of increased sensitivity.

A still further object of this invention is to provide means for combining successive impulses of opposite polarity so as to obtain a series of uni-potential impulses.

This invention will be better understood from the following description when considered in connection with the accompanying drawing.

Referring to the drawing,

Figure 1 illustrates the nature of the output voltage of a direction finding receiver when the loop antenna connections are reversed after each group of three impulses;

Figure 2 illustrates the result of combining successive impulses of different polarity.

Figures 3 and 4 illustrate receiver output voltages having an increased average value;

Figure 5 is a schematic diagram of a device in accordance with this invention; and Figure 6 is a schematic diagram of a time delay network.

In order to obtain a sense indication as a loop antenna is rotated to one side or the other of its minimum signal position, it is customary, in direction finders, to combine the signals from the loop antenna and a non-directional antenna and to reverse the phase of the potential from the loop so that it is alternately added to, and subtracted from the potential from the non-directional antenna. Where impulse transmission is utilized, the same system is used. The reversal of polarity may take place after each impulse or after a certain number of impulses.

Fig. 1 represents the voltage which would appear in the output vs. time graph of a directional receiver in which the reversal of the loop polarity takes place after every three impulses, that is, the time T of Fig. 1 corresponds to the period of the reversing operation. The group $a$ impulses, having the greater amplitude, indicate that the potentials from the two antennas are adding while the group $b$ impulses represent the difference between the potentials from the two antennas.

To obtain left-right indication, the polarity of the output potential is reversed simultaneously with the reversal of the loop antenna potential, so that the impulses in group $b$, for example, flow in a negative direction. When the plane of the loop antenna is in line with the transmitter successive impulses or groups of impulses are of constant amplitude and opposite polarity. When this condition exists and the output currents are applied to an indicating meter, the instrument will produce no observable steady deflection, but will vibrate about "zero" in response to the equal and opposite impulses which are successively applied to it. When, however, the angle of the loop with respect to the transmitter changes, the amplitude of the received impulses increases for one position of the reversing switch and decreases for the other. As a result, the indicator receives a series of impulses which are stronger in one direction than in the other and an "off course" indication is given. Due to the intermittent nature of the impulses, the indicator tends to vibrate or flicker so that the indication generally is not satisfactory. It is possible to reduce the vibration of the needle somewhat by reversing the loop connections at a relatively high frequency, but this is impractical and undesirable due to the resulting interference in the receiver.

In accordance with this invention, the impulses in group $a$, Fig. 1, are separated from the impulses of group $b$ and the first group of impulses to arrive is inverted in polarity and passed through an electric time delaying network which has a time constant such that the impulses of the delayed group reach the indicating instrument at the same instant as the impulses in the next succeeding group. Consequently, two impulses of opposite polarity are applied to the indicator at the same instant. The amplitude and polarity of the effective potential which actuates the indicator is dependent upon the relative amplitudes of the two impulses.

The curves of Fig. 2 represent the simultaneous arrival at the indicator of a positive and a negative impulse. Since the positive impulse is, in the illustration, the larger, the resultant positive potential is indicated by the shaded area. Successive impulses which actuate the indicator are, therefore, of the same polarity, and the tendency of the indicator to vibrate is greatly reduced. In addition, the frequency of reversal may be reduced before objectional vibration appears.

In the impulse type left-right indicator, the mean value of the impulses is low due to the long interval between impulses. To overcome this disadvantage a further modification is suggested. The audio frequency impulses are utilized to charge a condenser and the discharge period of the condenser is made long with respect to the charging period. The average value of the potential across the condenser is therefore increased. By utilizing this potential to control the left-right indicator, the average value of the current through the indicator is also increased and a more satisfactory indication is obtained. Fig. 3 represents the voltage across such a condenser, the dotted section at $b$ indicating the impulses which have been separated and which will subsequently be recombined with the delayed impulses.

By increasing the discharge time of the condenser still further, it is possible to maintain the voltage across the condenser at a substantial portion of its maximum value, thus greatly increasing the average voltage. Fig. 4 represents the indicator control voltage when a long discharge time is utilized. In this figure the negative voltage due to the delayed impulses is also shown. The left-right indicator would read "on course," as the positive and negative components of the applied voltage are at all times equal.

Fig. 5 shows a circuit arrangement which may be utilized in practicing this invention. A non-directional antenna A and a directional loop antenna D are conected to a radio receiver in the well known manner. The connection from the directional antenna includes a reversing switch $S_1$. The receiver output is alternately connected through switch $S_2$ to a pair of detector tubes $R_1$ and $R_2$. Switches $S_1$ and $S_2$ are preferably mechanically coupled together and operated in unison so that, for one polarity of the loop antenna, the signal is impressed on one tube, and for the other polarity, the signal is impressed on the other tube, this dividing the $a$ and $b$ groups of impulses between the two tubes.

Resistors $r_1$ and $r_2$ connect the anode potential to the two tubes $R_1$ and $R_2$. The voltage impulses appearing across resistors $r_1$ and $r_2$ charge capacitors $C_1$ and $C_2$, respectively, through the rectifiers $G_1$ and $G_2$, which are connected in parallel with resistors $W_1$ and $W_2$. The rectifiers provide a low impedance path for currents which charge the condensers, but the discharge currents are determined by the shunt resistors $W_1$ and $W_2$, which have a high impedance. Thus the capacitors are quickly charged by the impulses, but have a slower rate of discharge, as indicated in Figs. 3 and 4.

The charging time constants are $r_1 \cdot C_1$ and $r_2 \cdot C_2$, while the discharge time constants are $(r_1 W_1) C_1$ and $(r_2 W_2) C_2$. In order to maintain symmetry between the positive and negative impulses, it is also necessary that:

$r_1$ equals $r_2$; $W_1$ equals $W_2$; and $C_1$ equals $C_2$

The voltage across capacitor $C_2$ is applied to the input of a time delay device L which includes for example, two capacitors $C_0$ and two resistors $r_0$ connected in the well known manner. The delayed output voltage appears between points P and $P_3$. The difference between this voltage and the voltage across $C_1$, available between points P and $P_1$, is applied to the input electrode of an amplifier $R_3$. That is, when points $P_1$ and $P_3$ have the same instantaneous amplitude and polarity with respect to any common reference potential, point P for example, no voltage difference will exist between the grid and cathode of tube $R_3$. The two voltages are brought into the necessary time phase by suitably designing the time delay network so that the delay is equal to the time between successive pulse groups. Thus successively received pulse groups appear at the amplifier $R_3$ at the same instant. Consequently, the plate current $i_0$ of the amplifier is constant. The left-right indicator shows a certain deflection which is to be marked as the zero point. If the plane of the directional antenna changes, the amplitude of the impulse in one of the amplifiers will increase while that in the other will decrease. This causes the voltage appearing across the input to the amplifier $R_3$ to become more or less positive and the plate current $i_0$ is increased or decreased an amount which corresponds to the deviation from the desired course.

Fig. 6 represents a time delay network which may be employed in place of L in Fig. 5. It comprises resistors $r_0$ and capacitors $C_0$ connected as shown. While the delay network is shown connected in the output circuit of the detector tube $R_2$ it may be connected ahead of the tube.

I claim as my invention:

1. In an impulse direction finding system having means for periodically reversing the directivity pattern of said system and for simultaneously reversing the polarity of the received impulses, means for delaying said received impulses of one polarity an amount equal to the period of reversal, means for combining said delayed impulses with subsequently received impulses, and indicating means responsive to said combined impulses.

2. In an impulse direction finding system having means for periodically reversing the directivity pattern of said system and for simultaneously reversing the polarity of the received impulses, means for selecting inverted impulses corresponding to one directivity pattern, means for delaying said inverted impulses a time equal to said period of reversal, means for combining said delayed impulses with impulses corresponding to the other directivity pattern, and indicating means responsive to said combined impulses.

3. A device of the character described in claim 2 which is further characterized by means for increasing the mean value of said impulses.

4. In an impulse direction finding system having means for periodically reversing the directivity pattern of said system and for simultaneously reversing the polarity of the received impulses, means for selecting inverted impulses corresponding to one directivity pattern, means for delaying said inverted impulses a time equal to said period of reversal, means for increasing the mean value of the potential of said delayed impulses and of impulses corresponding to the other directivity pattern, and indicating means responsive to the potential difference between said impulses.

5. A left-right indicator for impulse direction finding systems, comprising directional and non-directional antennas, means for reversing the polarity of impulses from one of said antennas, means for combining impulses from said antennas, means for separating combined impulses corresponding to one polarity of said antenna from combined impulses corresponding to the other polarity of said antenna, means for delaying impulses corresponding to one polarity of said antenna a time equal to the period of said reversal, and indicating means responsive to the amplitude difference between said delayed impulses and impulses corresponding to the other polarity of said antenna.

6. In an impulse direction finding system the method of providing left-right indication which includes the steps of periodically reversing the directivity pattern of said system, simultaneously reversing the polarity of the impulses received by said system, delaying the received impulses corresponding to one directivity pattern a time equal to said period of reversal, and combining said delayed impulses with impulses corresponding to the other directivity pattern to obtain a succession of unipotential impulses whose polarity is an indication of direction.

GÜNTHER ULBRICHT.